US012786321B2

(12) United States Patent
Mogaki et al.

(10) Patent No.: US 12,786,321 B2
(45) Date of Patent: Nov. 3, 2026

(54) INFORMATION PROCESSING SYSTEM, INFORMATION PROCESSING METHOD, AND STORAGE MEDIUM THAT COLLECT LEARNING DATA

(71) Applicant: CANON KABUSHIKI KAISHA, Tokyo (JP)

(72) Inventors: Shunsuke Mogaki, Kanagawa (JP); Tetsu Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 18/654,057

(22) Filed: May 3, 2024

(65) Prior Publication Data

US 2024/0388662 A1 Nov. 21, 2024

(30) Foreign Application Priority Data

May 15, 2023 (JP) ................................ 2023-080385

(51) Int. Cl.
*H04N 1/00* (2006.01)

(52) U.S. Cl.
CPC ..... *H04N 1/00084* (2013.01); *H04N 1/00344* (2013.01)

(58) Field of Classification Search
CPC ....................... H04N 1/00084; H04N 1/00344
See application file for complete search history.

(56) References Cited

FOREIGN PATENT DOCUMENTS

JP 2019-211940 A 12/2019

*Primary Examiner* — Juan M Guillermety
(74) *Attorney, Agent, or Firm* — Venable LLP

(57) ABSTRACT

An information processing system that collects learning data includes an error history information acquiring unit configured to acquire error history information of a target device, a part replacement information acquisition unit configured to acquire part replacement information of the target device, an association unit configured to generate first association data in which the error history information and the part replacement information are associated with each other, and a duplication unit configured to generate second association data in which information on a predetermined replacement part is replaced with information on another replacement part that includes the predetermined replacement part and associated with the error history information.

8 Claims, 8 Drawing Sheets

INFORMATION PROCESSING SYSTEM, INFORMATION PROCESSING METHOD, AND STORAGE MEDIUM THAT COLLECT LEARNING DATA

BACKGROUND OF THE INVENTION

Field of the Invention

The present invention relates to an information processing system that collects learning data, an information processing method, and a storage medium.

Description of the Related Art

For example, in a case in which an abnormality, for example, an error and a failure, occurs in an image forming apparatus, for example, a multifunction peripheral, a person in charge of maintenance, for example, a service engineer is dispatched in response to the notification about the abnormality. The person in charge of maintenance checks the manual and performs maintenance such as part replacement.

In recent years, cloud computing has become more widespread. The main feature of cloud computing is that data conversion and data processing are distributed and executed by using many computing resources, and requests from many clients are processed in parallel by distributed parallel processing. By using cloud computing, a system developer can easily procure necessary computing resources and concentrate on developing system functions.

One of the elements having high affinity with cloud computing is artificial intelligence (AI). One of core technologies for realizing AI is machine learning. In machine learning, it is possible to create a learning model in which features of data (characteristics, patterns, tendencies, and the like) are extracted by analyzing a large amount of data (big data) using a learning algorithm.

Since a large amount of computing resources are required to safely store and analyze such a large amount of data, there are many cases in which machine learning is introduced into a cloud computing environment. In the maintenance of the above-described image forming apparatus and the like, a method of learning data collected from a plurality of image forming apparatuses and the like and supporting maintenance work such as part replacement by using the obtained learned model has been proposed.

For example, in Japanese Patent Application Laid-Open No. 2019-211940, estimation information generated based on device information that has been collected from a plurality of devices and operator information held by operators such as a service engineer is acquired. The operator information includes part information and work situation information that have been acquired from an information terminal of the operator. As a result, operators such as a service engineer can efficiently perform a replacement work.

In contrast, with respect to the provision of information for which a person in charge of maintenance, for example, a service person can appropriately respond to errors such as a failure, there is a demand for a machine learning model that estimates an appropriate response. In order to create the machine learning model, a large amount of learning data is required, which is associated with an error including a failure and an appropriate response record to the error (for example, a replacement part).

However, during actual operation, there is a case in which units of replacement parts are different. For example, there is a case in which a specific part A is replaced in a certain region, while a unit X that is a larger scale including the part A is replaced in a different region.

As a result, when a large amount of data is collected for learning, even though the ground truth labels (replacement parts) are actually the same, they are recognized as different ground truth labels due to the different scales, and the learning accuracy may be reduced.

In contrast, when learning is performed by using only data having the same scale, the amount of data that can be used for learning decreases, and consequently learning accuracy may also decrease. In particular, in a case, for example, “replacement is performed on a part-by-part basis in many regions, but replacement is performed on a unit-by-unit basis in some regions”, the number of pieces of minor data (data that targets units) tends to decrease.

SUMMARY OF THE INVENTION

According to one aspect of the present invention, an information processing system that collects learning data comprising: an error history information acquiring unit configured to acquire error history information of a target device; a part replacement information acquisition unit configured to acquire part replacement information of the target device; an association unit configured to generate first association data in which the error history information and the part replacement information are associated with each other; and a duplication unit configured to generate second association data in which information on a predetermined replacement part is replaced with information on another replacement part that includes the predetermined replacement part and associated with the error history information.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
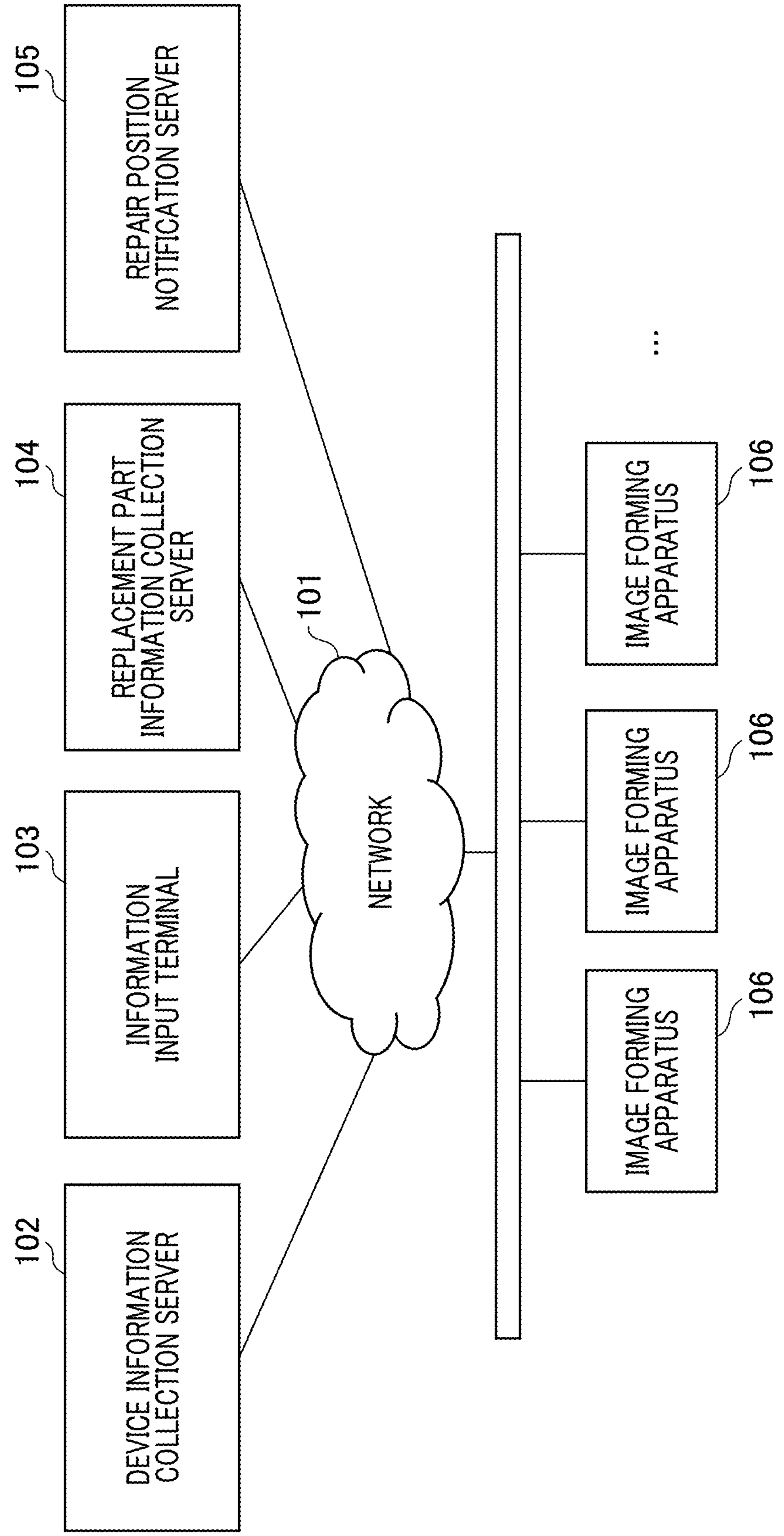
FIG. 1 is a diagram showing a configuration example of an information processing system according to the first embodiment of the present invention.

FIG. 1 is a diagram showing a configuration example of an information processing system according to the first embodiment of the present invention, and, in FIG. 1, a plurality of image forming apparatuses 106 are, for example, a digital multi-function peripheral, a facsimile apparatus, a laser beam printer, a scanner apparatus, and the like. Note that, in the following embodiments, data generated to generate a machine learning model is referred to as "learning data", and data input to a generated machine learning model to perform estimation is referred to as "input data".

As shown in FIG. 1, learning data collection including an appropriate response to the error in the first embodiment is performed using the device information collection server 102, the replacement part information collection server 104, the repair position notification server 105, and the like.

Additionally, a machine learning model is created by using a learning data, and estimation is performed on the service side that has received an error notification about the image forming apparatus by using the model. Additionally, the estimation result is displayed on a WEB UI of the portal site that is accessible by a person in charge of maintenance.

Reference numeral 102 denotes an apparatus information collection server that configures an online service system that provides an information collecting system from the image forming apparatuses. The apparatus information collection server collects and stores error history information from a plurality of image forming apparatuses 106 via a network 101.

Reference numeral 103 denotes an information input terminal that is held by the person in charge of maintenance, and when the person in charge of maintenance performs maintenance work, the person in charge of maintenance inputs the content of the maintenance work to the information input terminal 103. The information input terminal 103 holds the input content of the maintenance work.

Additionally, the information input terminal 103 transmits the input contents of the maintenance work to the replacement part information collection server 104, the repair position notification server 105, and the like via the network 101. Additionally, the information input terminal 103 can receive repair part estimation information that has been transmitted from the repair position notification server 105 via the network 101, and it can display the repair part estimation information on the screen of the information input terminal 103.

Reference numeral 104 denotes a replacement part information collection server that collects information from the information input terminal 103 and provides online services. The replacement part information collection server 104 receives the replacement part information that has been transmitted by the information input terminal 103 via the network 101 and collects and stores the acquired information.

Reference numeral 105 denotes a repair part notification server that collects the information from the device information collection server 102 and the replacement part information collection server 104 and provides online services, and receives various information via the network 101.

The various kinds of information include the feedback information transmitted by the information input terminals 103, the error history information that is held by the device information collection server 102, and the replacement part information that is held by the replacement part information collection server 104. The repair position notification server 105 creates and accumulates learning data based on the received various kinds of information. Thus, the information process system of the first embodiment including the repair position notification server 105 can collect and accumulate learning data.

Figure 2A:
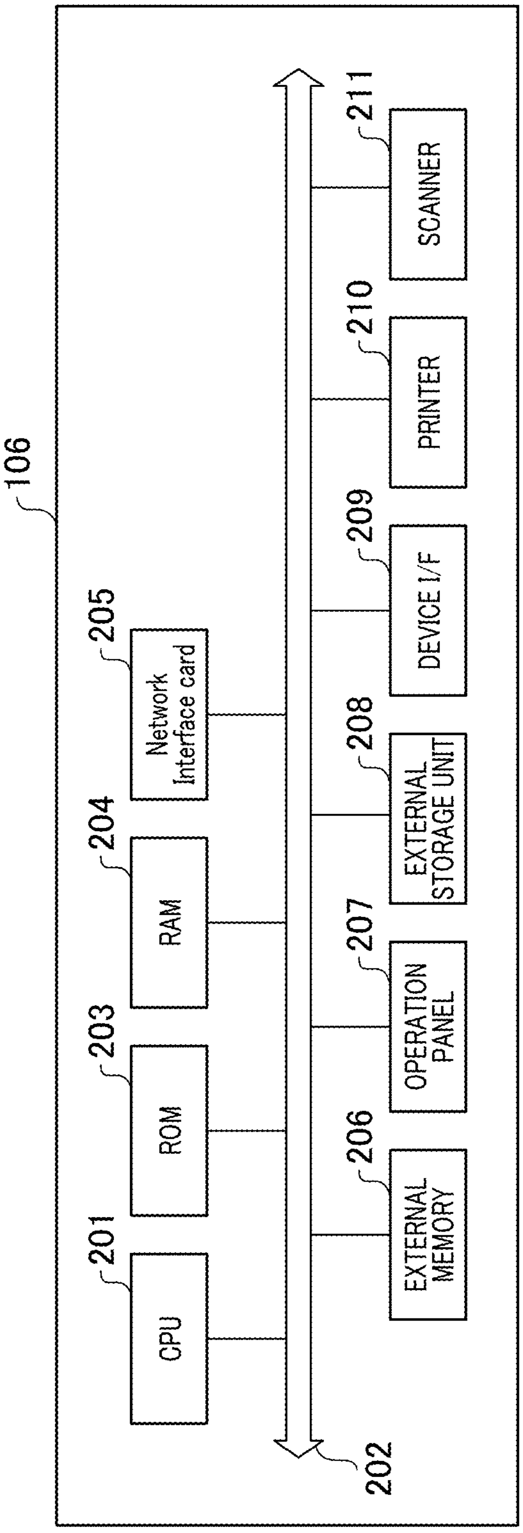
FIG. 2A is a diagram showing an example of a hardware configuration of an image forming apparatus 106 according to the first embodiment of the present invention.

FIG. 2A is a diagram illustrating an example of a hardware configuration of the image forming apparatus 106 according to the first embodiment of the present invention. Each configuring element of the hardware is connected to a system bus 202. Reference numeral 201 denotes a CPU that serves as a computer that controls the entire apparatus, and the CPU integrally controls various devices that are connected to the system bus 202 by executing a computer program stored in a ROM 203 and an external memory 206.

Reference numeral 203 denotes a ROM, which is a storage unit that stores therein programs such as a basic I/O program, and various data such as font data and template data to be used in document processing.

Reference numeral 204 denotes a RAM that functions as, for example, a work area, a main memory of the CPU 201, and is configured so that a memory capacity can be expanded by an option RAM connected to an expansion port (not illustrated). Reference numeral 205 denotes a network interface card (NIC) that exchanges data to and from an external device via the interface 205.

Reference numeral 207 denotes an operation panel that displays a screen and receives an operation instruction from a user via the screen. The operation panel 207 has buttons for performing the settings of an operation mode and the like of the image forming apparatus, displaying an operation status of the image forming apparatus, and performing operations such as copy designation, and a display unit, for example, a liquid crystal panel and the like. Reference numeral 208 denotes an external storage unit that functions as a large-capacity memory.

Reference numeral 209 denotes a device interface that is a connection interface to and from an external device that can be connected via a USB and the like. In a printer 210, a known printing technique is used, and examples of a suitable execution system include an electrophotography (laser-beam method), an inkjet method, a sublimation (thermal transfer) method, and the like.

The printer 210 discharges image data that has been converted from print data (PDL language, PDF language, and the like). In a scanner 211, a known image reading technology is used, and the scanner 211 optically scans a paper document that is placed on a transparent top plate and converts the document into an image. Additionally, the scanner 211 continuously reads a plurality of paper documents that are placed on an automatic document feeder (ADF) and converts the documents into images.

Figure 2B:
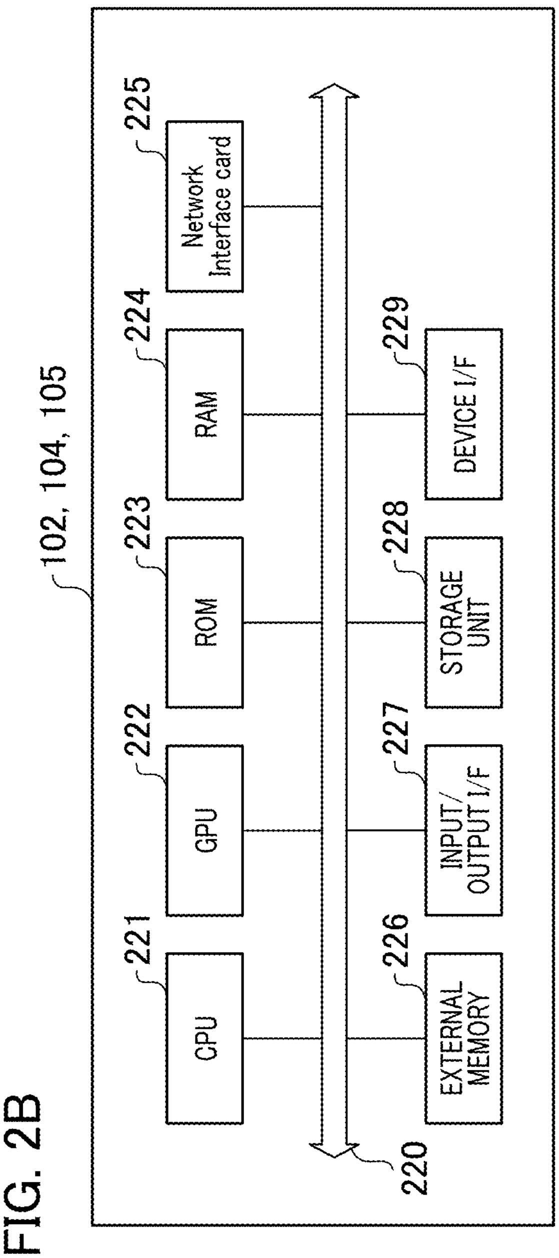
FIG. 2B is a diagram showing an example of a hardware configuration of a device information collection server 102, a replacement part information collection server 104, and a repair position notification server 105 according to the first embodiment of the present invention.

FIG. 2B is a diagram illustrating an example of a hardware configuration of the device information collection server 102, the replacement part information collection server 104, and the repair position notification server 105 according to the first embodiment of the present invention. Each configuring element of the hardware is connected to a system bus 220. Note that the hardware configuration of the information input terminal 103 may be similar to the configuration illustrated in FIG. 2B.

Reference numeral 221 denotes a CPU serving as a computer that controls the entire apparatus, and the CPU 221 integrally controls various devices that are connected to the system bus 220 by executing a computer program stored in a ROM 223 and an external memory 226.

Reference numeral 222 denotes a GPU that is a calculation device specialized for vector calculation in image processing, machine learning, and the like. Reference numeral 223 denotes a ROM that is a storage unit, and the ROM 223 stores various data such as a basic I/O program therein.

Reference numeral 224 denotes a RAM that functions as, for example, a work area, a main memory of the CPU 221 and the GPU 222, and the RAM 224 is configured so that a capacity of the memory can be expanded by an optional RAM that is connected to an expansion port (not illustrated). Reference numeral 225 denotes a network interface card (NIC) that exchanges data to and from an external device via the network interface card 225.

Reference numeral 227 denotes an input/output interface, by which a screen display and a user operation instruction can be received via devices such as a display, a keyboard, a mouse, a smartphone, and a tablet. Reference numeral 228 denotes an external storage unit that functions as a large-capacity memory. Reference numeral 229 denotes a device interface that is a connection interface to and from an external device that is connectable via a USB and the like.

Figure 3A:
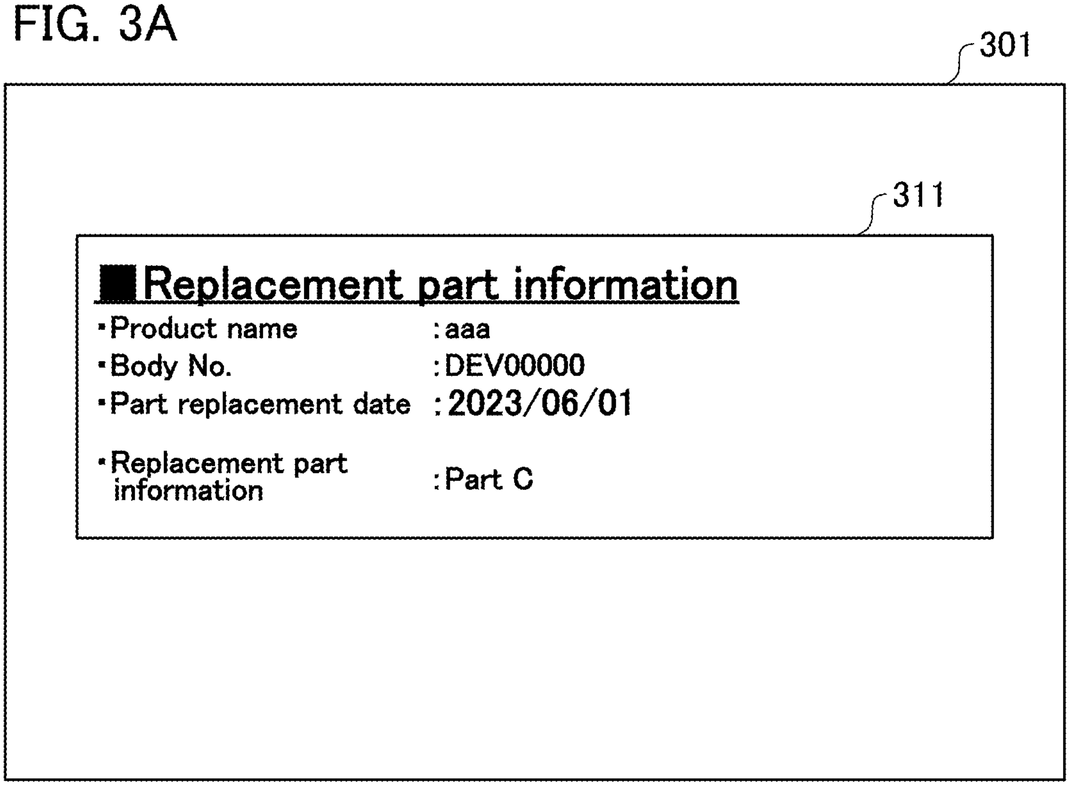
FIGS. 3A and 3B are diagrams showing examples of screens displayed on an information input terminal 103 according to the first embodiment of the present invention.
Figure 3B:
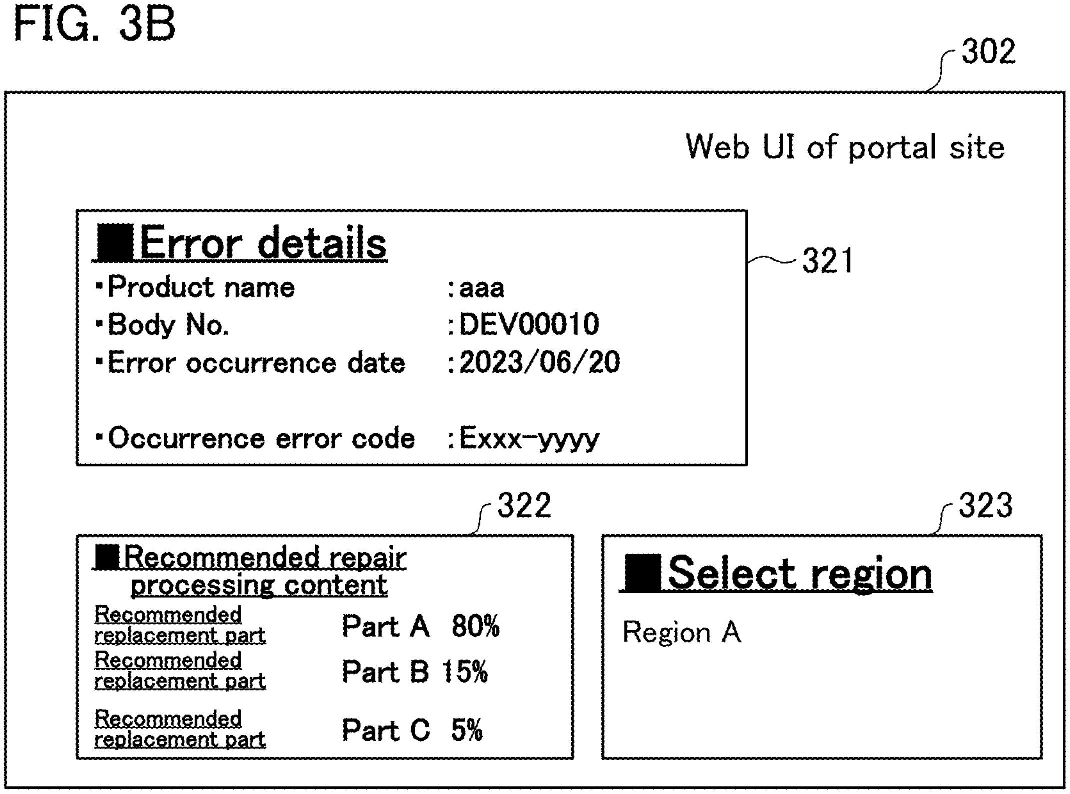

FIGS. 3A and 3B are diagrams showing examples of screens displayed on the information input terminal 103 according to the first embodiment of the present invention. Reference numeral 301 in FIG. 3A denotes an example of an input screen for information to be transmitted to the replacement part information collection server 104. A person in charge of maintenance inputs the replacement part information 311 of an actually replaced part.

The replacement part information 311 includes a product name, a body number, a part replacement date, replacement part information, and the like. The "product name" is a name representing a product type of the image forming apparatus. The "body number" is a unique ID assigned to each image forming apparatus. The "part replacement date" is a date on which the maintenance person replaced a part.

The "replacement part information" is an abbreviation of a part actually replaced by the person in charge of maintenance. Although a part is displayed as an example in the drawing, here, a single unit that is a unit larger than a part is displayed depending on a country, a region, a device, and the like. Note that the term "unit" used herein means a part that is configured by a plurality of parts and can be replaced in units.

Reference numeral 302 in FIG. 3B denotes an example of a portal screen for inputting information to be transmitted to the repair position notification server 105, and the screen is displayed on the information input terminal 103. The above-described portal screen includes an error detailed information display unit 321 including information on the image forming apparatus to be repaired, a recommended repair processing content display unit 322, and a region selection unit 323. The error detailed information display unit 321 displays a product name, a body number, an error occurrence date, and an occurrence error code of the image forming apparatus to be repaired.

The "product name" is a name representing the product type of the image forming apparatus to be repaired. The "body number" is a unique ID assigned to each image forming apparatus to be repaired. The "error occurrence date" is the date on which the error occurred. The "occurrence error code" is a unique character string code for recognizing the type of the error.

The recommended repair processing content display unit 322 displays the recommended maintenance processing that is estimated by the repair position notification server 105 and is highly likely to solve the event (error). The recommended maintenance processing includes processing such as replacement, cleaning, repair, and restart and the like of a specific part. Additionally, in the recommended maintenance processing display, the degree of certainty in which the event (error) is solved by the processing is displayed based on the estimation result, as shown in FIG. 3B.

That is, in the example of the recommended repair processing content display unit 322 as shown in FIG. 3B, the degree of certainty in which the error is solved by replacing the part A is 80%, the degree of certainty in which the error is solved by replacing the part B is 15%, and the degree of certainty in which the error is solved by replacing the part C is 5%. Note that although, in FIG. 3B, the parts A to C are displayed as examples, a unit that is a replacement unit larger than a part can be displayed depending on a country, a region, a device, and the like.

The region selection unit 323 is a screen for inputting a region used by the user of the information input terminal 103. Additionally, the scale of the corresponding recommended replacement part displayed in the recommended repair processing content display unit 322 is switched according to the input information of the use region.

Specifically, the recommended maintenance processing displayed on the recommended repair processing content display unit 322 is switched between the part replacement and the unit replacement. Note that the input of the region information may be performed by using region information handled by the user (the person in charge of maintenance) of the information input terminal 103 who has logged in, region information of the registered image forming apparatus, and the like, in addition to the region selection unit 323.

Figure 4:
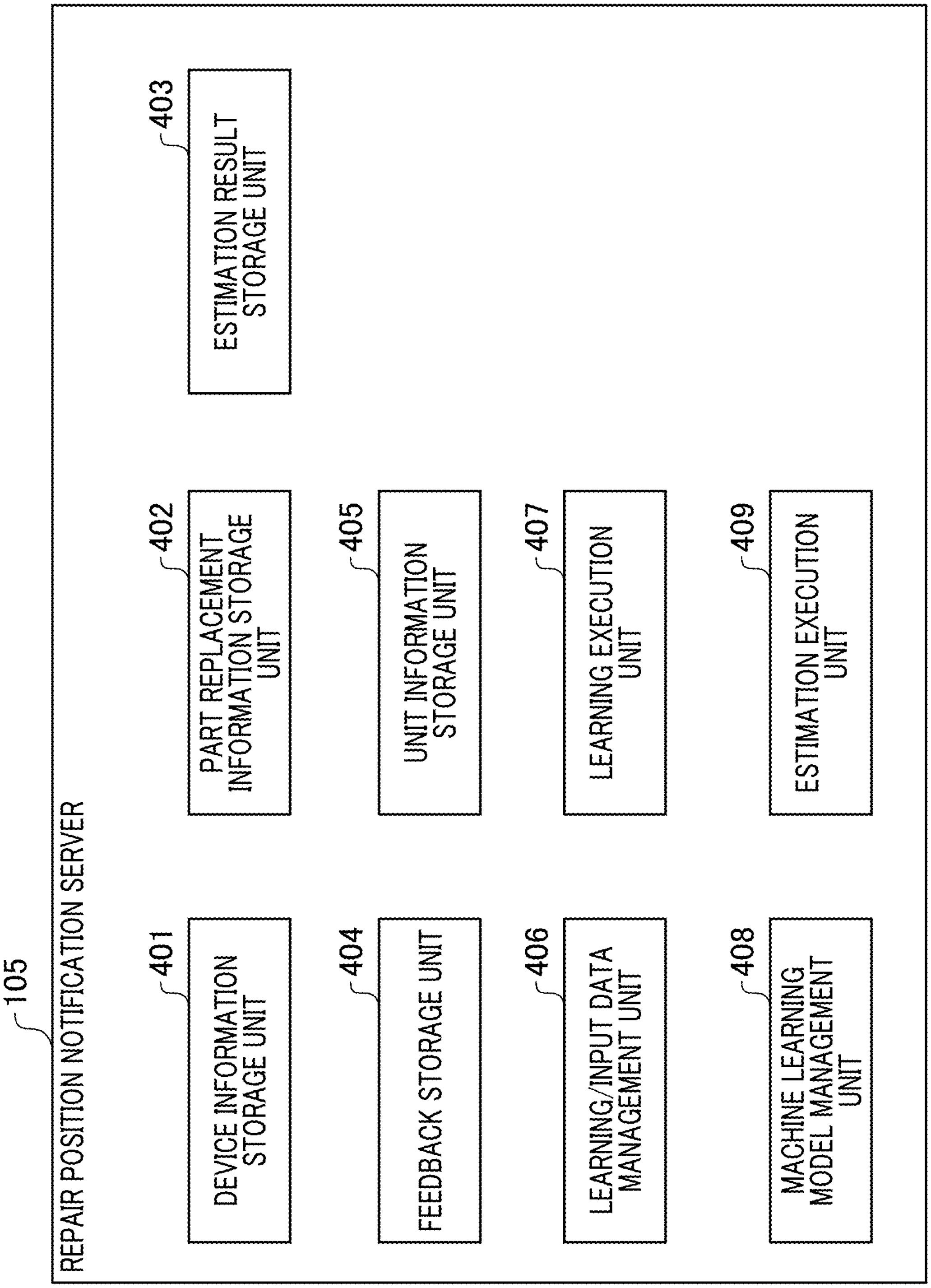
FIG. 4 is a functional block diagram showing a configuration example of the repair position notification server 105 according to the first embodiment of the present invention.

FIG. 4 is a functional block diagram illustrating an example of the configuration of the repair position notification server 105 according to the first embodiment of the present invention. Note that some of the functional blocks as shown in FIG. 4 are realized by causing a CPU and the like serving as a computer included in the repair position notification server 105 to execute a computer program stored in a memory serving as a storage media.

However, some or all of them may be realized by hardware. As the hardware, a dedicated circuit (ASIC), a processor (reconfigurable processor, DSP), and the like can be used. Additionally, each of the functional blocks as shown in FIG. 4 need not be incorporated in the same housing and may be configured as separate devices connected to each other via a signal path.

The computer program of the repair position notification server 105 is read from a secondary storage unit and the like that are connected via the RAM 224, the storage unit 228, and the device I/F 229, and executed by the CPU 221 and the GPU 222. Access to the external units such as the device information collection server 102, the information input terminal 103, and the replacement part information collection server 104 is performed via the network interface card 225.

The repair position notification server 105 has, as data storage units, a device information storage unit 401, a part replacement information storage unit 402, an estimation result storage unit 403, a feedback storage unit 404, and a unit information storage unit 405.

Additionally, the repair location notification server 105 also has a learning/input data management unit 406, a learning execution unit 407, a machine learning model management unit 408, and an estimation execution unit 409. The device information storage unit 401 stores error information and device information of the image forming apparatus that have been received from the device information collection server 102 via the network 101.

The part replacement information storage unit 402 stores replacement part information that has been received from the replacement part information collection server 104 via the network 101. The feedback storage unit 404 receives and stores feedback information that has been input by the information input terminal 103 via the network 101.

The unit information storage unit 405 holds information related to various units including (containing) parts. Specifically, the unit information storage unit 405 holds information on what parts are included (contained) in various units, what units are replaceable for each model (image forming apparatus), what parts/units are handled in each area, and the like.

The learning/input data management unit 406 creates and stores learning data and input information based on each piece of element information stored in the repair position notification server 105. Each piece of element information includes, for example, the following information.

- Image forming apparatus information held by the device information storage unit 401
- Replacement part information held by the part replacement information storage unit 402
- Feedback information held by the feedback storage unit 404
- Unit information held by the unit information storage unit 405

The learning/input data management unit 406 creates and stores learning data during learning of the machine learning model, and creates and stores input data during the estimation using the machine learning model. The learning execution unit 407 acquires learning data from the learning/input data management unit 406, executes learning based on a machine learning algorithm specified in advance, and generates a machine learning model.

The machine learning model is stored in the machine learning model management unit 408. Note that the learning may be repeatedly executed at predetermined time intervals or in accordance with a change in learning data stored in the learning/input data management unit 406 to recreate the machine learning model.

The machine learning model management unit 408 stores the machine learning model that has been created by the learning execution unit 407. Note that the machine learning model used for the estimation may be changed (replaced) by using, as a trigger, reception of the machine learning model from the learning execution unit 407, condition determination in the machine learning model management unit 408 (for example, a ground truth rate of a new machine learning model exceeds a certain value), and the like.

The estimation execution unit 409 acquires the input data from the learning/input data management unit 406 and inputs the input data to the machine learning model stored in the machine learning model management unit 408, thereby executing estimation. The estimation result storage unit 403 stores the estimation result that has been executed by the estimation execution unit 409.

The estimation result storage unit 403 transmits the estimation result to the information input terminal 103 via the network 101. Alternatively, the estimation result storage unit 403 may transmit the estimation result when receiving a request from the information input terminal 103 via the network 101.

The information input terminal 103 displays the estimation result on the portal screen, as indicated by reference numeral 322 in FIG. 3B. As described above, in the estimation result in the example of 322, the degree of certainty in which the error is solved by the replacement of the part A is 80%, and similarly, the degree of certainty is 15% in the case of the part B, and the degree of certainty is 5% in the case of the part C.

Figures 5A, 5B:
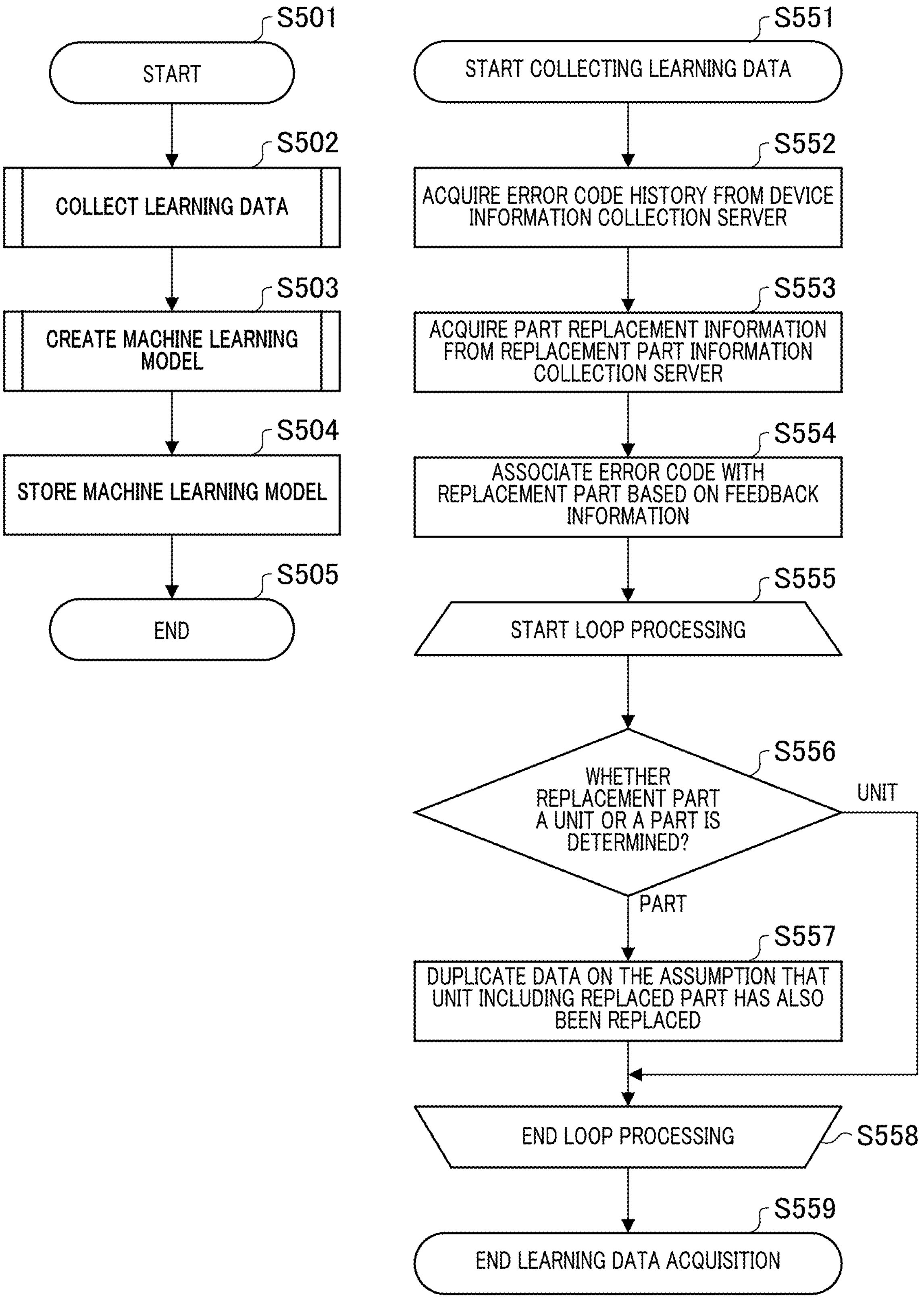
FIGS. 5A and 5B are flow charts illustrating an example of an information processing method according to the first embodiment of the present invention.

FIGS. 5A and 5B are flowcharts illustrating an example of the information processing method according to the first embodiment of the present invention, and FIG. 5A is an overall flowchart of the repair position notification server 105 in the first embodiment. Note that the CPU and the like serving as a computer in the repair position notification server 105 executes a computer program stored in the memory, and thereby, the operation of each step of the flowchart in FIG. 5A is sequentially performed.

First, in step S502, the repair position notification server 105 causes the learning-and-input-data management unit 406 to collect learning data. Then, in step S503, in the learning execution unit 407, a machine learning model is created using the collected learning data. Here, step S503 functions as a learning step (learning unit) that performs learning using learning data.

Additionally, in step S504, the created machine learning model is stored in the machine learning model management unit 408. Additionally, when an error occurs in the image forming apparatus, the repair position notification server 105 receives a notification from this image forming apparatus. Then, the repair position notification server 105 causes the estimation execution unit 409 to perform estimation using the machine learning model generated in the flow of FIG. 5A.

The estimation result is transmitted to the information input terminal 103 and displayed on a portal site that can be accessed by the person in charge of maintenance using the information input terminal 103 as shown in FIG. 3B. The person in charge of maintenance can input actual replacement part information via a screen 301 displayed on the information input terminal 103 as shown in FIG. 3A.

A screen 301 in FIG. 3A receives an input of replacement part information, and the input replacement part information is transmitted to the replacement part information collection server 104. Additionally, the person in charge of maintenance can input feedback information (repair result and the like) via the screen 302 in FIG. 3B displayed on the information input terminal 103.

The input of the feedback information may be performed via a button, a check box, and the like (not illustrated) in the recommended repair processing content display unit 322, or may be performed via pop-up, free input, and the like. When the feedback information is input on the screen 302 of FIG. 3B, the input feedback information is transmitted to the repair position notification server 105.

FIG. 5B is a flowchart illustrating a detailed example of the learning data collecting step (step S502) of the repair position notification server 105 according to the first embodiment. Note that the CPU and the like serving as a computer in the repair position notification server 105 executes a computer program stored in the memory, and thereby, the operation of each step of the flowchart in FIG. 5B is sequentially performed.

In step S551, collecting learning data starts. Additionally, in step S552, error code history information (error history information) is acquired from the device information collection server 102 and stored in the device information storage unit 401. Here, step S552 functions as an error history information acquiring step (error history information acquiring unit) of acquiring the error history information of the image forming apparatus serving as a target device.

An example of the error code history information collected by the device information collection server is shown in Table 1. In Table 1, the "product" is a name representing the product type of the image forming apparatus. The "body number" is a unique ID assigned to each image forming apparatus. The "area" is an area where the image forming apparatus is installed. The "error occurrence date" is the date on which the error occurred. The "occurrence error code" is a unique character string code for recognizing the type of the error.

For example, the first row of Table 1 means that "an error with an error code of Exxx-yyyy occurred on 2023 Jun. 1 in the body number DEV00000 of the product aaa installed in the area A".

TABLE 1

Error history information

| Product | Body No. | Region | Error occurrence date | Occurrence error code |
|---|---|---|---|---|
| aaa | DEV00000 | Region A | 2023 Jun. 01 | Exxx-yyyy |
| aaa | DEV00001 | Region B | 2023 Jun. 03 | Exxx-yyyy |
| aaa | DEV00001 | Region B | 2023 Jun. 05 | Exxx-zzzz |
| bbb | DEV00002 | Region C | 2023 Jun. 20 | Exxx-zzzz |
| bbb | DEV00002 | Region C | 2023 Jun. 21 | Exxx-yyyy |

Next, in step S553, part replacement information is acquired from the replacement part information collection server 104 and stored in the part replacement information storage unit 402. An example of the replacement part information collected by the replacement part information collection server is shown in Table 2. Here, step S553 functions as a part replacement information acquiring step (part replacement information acquiring unit) of acquiring the part replacement information of the target device.

In Table 2, the "product" is a name representing a product type of the image forming apparatus, the "body number" is a unique ID assigned to each image forming apparatus. The "part replacement date" is a date on which the person in charge of maintenance replaced a part. The "replacement part" is a name of a part actually replaced by the person in charge of maintenance.

For example, the first row of Table 2 means that "the part A of the product aaa with the body number DEV00000 was replaced on 2022 Feb. 5". Additionally, the fifth line of Table 2 means that "the unit X of the product bbb with the body number DEV00002 was replaced on 2022 Feb. 25".

TABLE 2

Replacement part information

| Product | Body No. | Part replacement date | Replacement part |
|---|---|---|---|
| aaa | DEV00000 | 2022 Feb. 05 | Part A |
| aaa | DEV00001 | 2022 Feb. 10 | Part B |
| aaa | DEV00001 | 2022 Feb. 10 | Part C |
| aaa | DEV00001 | 2022 Feb. 10 | Part A |
| bbb | DEV00002 | 2022 Feb. 25 | Unit X |
| bbb | DEV00002 | 2022 Feb. 25 | Unit Y |

Next, in step S554, the error code information and the replacement part information are associated with each other based on the feedback information held by the feedback storage unit 404. Here, step S554 functions as an association step (association unit) of generating first association information in which the error history information and the part replacement information are associated with each other.

An example of the feedback information is shown in Table 3. In Table 3, the "product" is a name representing a product type of the image forming apparatus, and the "body number" is a unique ID assigned to each image forming apparatus. The "part replacement date" is a date on which the person in charge of maintenance replaced a part. The "occurrence error code" is a unique character string code for recognizing the type of the error. The "replacement part" is a name of a part actually replaced by the person in charge of maintenance.

For example, the first row of Table 3 means that "the error code Exxx-yyyy occurred at 2023 Jun. 5 in the machine number DEV00000 of the product aaa, and the part A was replaced in response thereto."

TABLE 3

Feedback information

| Product | Body No. | Part replacement date | Occurrence error code | Replacement part |
|---|---|---|---|---|
| aaa | DEV00000 | 2022 Feb. 05 | Exxx-yyyy | Part A |
| aaa | DEV00001 | 2022 Feb. 10 | Exxx-yyyy | Part B |
| aaa | DEV00001 | 2022 Feb. 10 | Exxx-zzzz | Part C |
| bbb | DEV00002 | 2022 Feb. 25 | Exxx-yyyy | Unit X |
| bbb | DEV00002 | 2022 Feb. 25 | Exxx-zzzz | Unit Y |

Additionally, in step S554, the result in which the error code information and the replacement part information are associated with each other based on the feedback information is generated as shown in Table 4 and stored. Note that data in which the error code information and the replacement part information are associated with each other as shown in Table 4 is referred to here as first association data.

TABLE 4

Association between error and replacement part

| Product | Body No. | Region | Error occurrence date | Occurrence error code | Replacement part |
|---|---|---|---|---|---|
| aaa | DEV00000 | Region A | 2023 Jun. 01 | Exxx-yyyy | Part A |
| aaa | DEV00001 | Region B | 2023 Jun. 03 | Exxx-yyyy | Part B |
| aaa | DEV00001 | Region B | 2023 Jun. 05 | Exxx-zzzz | Part C |
| bbb | DEV00002 | Region C | 2023 Jun. 20 | Exxx-zzzz | Unit X |
| bbb | DEV00002 | Region C | 2023 Jun. 21 | Exxx-yyyy | Unit Y |

Next, in step S555, loop processing starts for each association of the error code information and the replacement part information in each row of Table 4, which is the output of step S554. Then, in step S556, in the unit information storage unit 405, whether each replacement part shown in each row of Table 4 is a single part or a unit is determined.

Specifically, the unit information storage unit 405 determines whether the value of the column of each "replacement part" shown in Table 4 is a part or a unit, based on unit/part correspondence information stored in the unit information storage unit 405. Table 5 shows an example of the unit/part correspondence information stored in the unit information storage unit 405.

The "unit name" is a name representing a unit. The "included parts" is a list of parts that the unit includes. For example, the first row of Table 5 means that "the unit X includes the part A and the part D". Note that "include" in the first embodiment has the same meaning as "contain" or "include".

In a case in which the value of the column of the "replacement part" in Table 4 is included in the column of "unit name" shown in Table 5, the replacement part is determined to be a unit. In a case in which the value of the column of the "replacement part" in Table 4 is not included in the column of the "unit name" shown in Table 5, the replacement part is determined to be a part.

TABLE 5

Unit/part correspondence information

| Unit name | Included part |
|---|---|
| Unit X | [Part A, Part D] |
| Unit Y | [Part B, Part C, Part D] |

In a case in which it is determined in step S556 that the replacement part is a unit, the process returns to step S555 without executing the processing, and the process proceeds to the data of the next row of Table 4. In a case in which it is determined in step S556 that the replacement part is a part, in step 557, the replacement part information is duplicated on the assumption that the unit including the replaced part has also been replaced.

Here, the step S557 functions as a duplication step (duplication unit) of replacing information on a predetermined replacement part with information on another replacement part including the predetermined replacement part and generating second association data associated with the error history information.

That is, in a case in which the "replacement part" is determined to be a part in step S556 for a predetermined row of Table 4, a unit including this part is extracted in the "included part" column of Table 5. Then, a row in which the "replacement part" column of the association data between the error code and the replacement part in Table 4 is replaced with the extracted unit is duplicated and added.

In step S558, when the loop processing is not completed for all rows of Table 4, the process returns to step S556 again via step S555 and the above operation is repeated. When the above process is completed for all the rows of Table 4, the loop processing ends in step S558, and the process proceeds to step S559, and the learning data end processing ends.

In Table 6, an example of the result of associating (copying) an error and a replacement part at the time when the processing is completed for all the rows of Table 4 is shown in step S559. In the duplicated and added data, "*" is given to the item of the replacement parts.

Note that, as shown in Table 6, data obtained by replacing information on a predetermined replacement part (for example, the part A) with information of another replacement part (for example, the unit X) including the predetermined replacement part and associating the information with the error history information is referred to as second association data in the first embodiment.

TABLE 6

Association between error and replacement part (duplicated)

| Product | Body No. | Region | Error occurrence date | Occurrence error code | Replacement part |
|---|---|---|---|---|---|
| aaa | DEV00000 | Region A | 2023 Jun. 01 | Exxx-yyyy | Part A |
| aaa | DEV00000 | Region A | 2023 Jun. 01 | Exxx-yyyy | Unit X* |
| aaa | DEV00001 | Region B | 2023 Jun. 03 | Exxx-yyyy | Part B |
| aaa | DEV00001 | Region B | 2023 Jun. 03 | Exxx-yyyy | Unit Y* |
| aaa | DEV00001 | Region B | 2023 Jun. 05 | Exxx-zzzz | Part C |
| aaa | DEV00001 | Region B | 2023 Jun. 05 | Exxx-zzzz | Unit Y* |
| bbb | DEV00002 | Region C | 2023 Jun. 20 | Exxx-yyyy | Unit X |
| bbb | DEV00002 | Region C | 2023 Jun. 21 | Exxx-zzzz | Unit Y |

Note that, in the first embodiment, in step S554 to step S558, after the association is performed, whether the replacement part is a unit or a part is determined, and the data is duplicated. That is, the information on the predetermined replacement part in the first association data is duplicated by being replaced with the information on another replacement part, and the second association data associated with the error history information is generated.

However, in this processing, the order may be changed, the data may be duplicated by determining whether the replacement part is a unit or a part first, and then the association may be performed. That is, the second association data in which the information on another replacement part and the error history information are associated may be generated after the information on the predetermined replacement part is replaced with the information on another replacement part.

Figure 6:
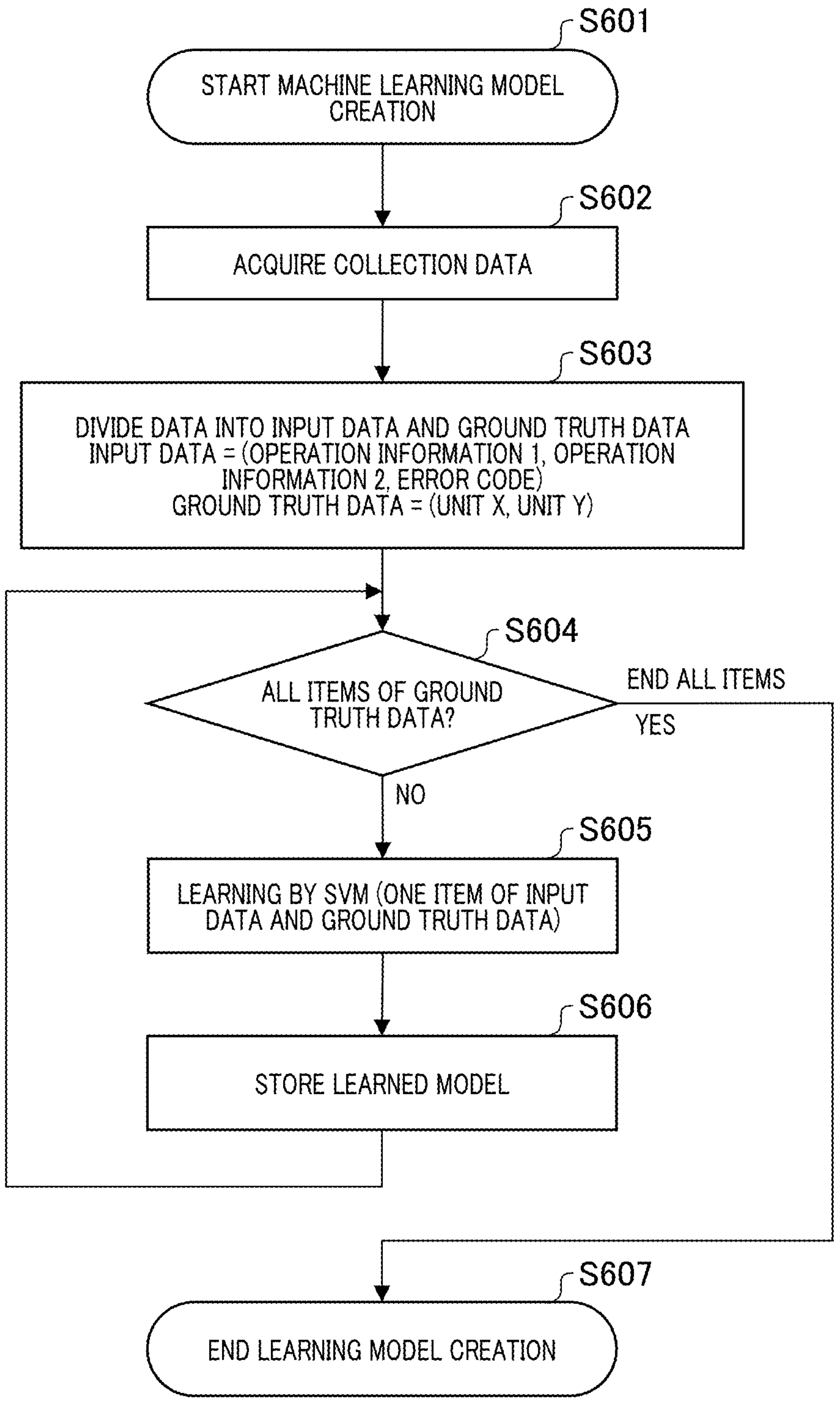
FIG. 6 is a flowchart illustrating an example of machine learning processing according to the first embodiment of the present invention.

Next, FIG. 6 is a flowchart showing an example of machine learning processing according to the first embodiment of the present invention, and shows an example of a machine learning model creation step (step S503) of the repair position notification server 105. Note that the CPU and the like serving as a computer in the repair position notification server 105 executes a computer program stored in the memory, and thereby, the operation of each step in the flowchart of FIG. 6 is sequentially performed.

In step S601, the creation of the machine learning model starts, and, in step S602, the repair position notification server 105 combines the data in Table 6 and the information on the image forming apparatus held by the device information storage unit 401, and sets the combined information as collected data. Note that, in this case, the data in Table 6 is divided into the rows of parts and the rows of units, and each of them is set as collected data. That is, the first association data and the second association data are each set as the collected data, and learning is performed using each of them.

After step S603, the learning process using the collected data related to the unit is performed. An example of the collected data is shown in Table 7. In Table 7, the "product" is a name representing the product type of the image forming apparatus. The "operation information 1" and the "operation information 2" are information indicating the use states of the image forming apparatus, such as the number of sheets of paper printed on the data acquisition date.

The columns of "Exxx-yyyy" and "Exxx-zzzz" each indicate an error code, where, in each case, "1" indicates that an error has occurred, and "0" indicates that no error has occurred. In the columns of "unit X" and "unit Y", "1" indicates the case of a unit including a replaceable part, and "0" indicates the case of not including a replaceable part.

For example, the first row of Table 9 indicates that "the unit X is replaced for the generated error code Exxx-yyyy on 2023 Jun. 1 with the body number DEV00000 of the product aaa installed in the area A, the value of the operation information 1 is 1, and the value of the operation information 2 is 7".

which each of a plurality of values is comprehensively tested, and the result having high estimation performance is used as a learning result.

Here, any algorithm may be used as the machine learning algorithm. For example, perceptron, logistic regression method, neural network, k-nearest neighborhood method, naive Bayes, convolutional neural network, decision tree, random forest, linear regression, polynomial regression, Lasso regression, Ridge regression, and the like may be used.

TABLE 7

| Collected data associated with Exxx-yyyy | | | | | | | | | |
|---|---|---|---|---|---|---|---|---|---|
| Product | Body No. | Region | Error occurrence date | Operation information 1 | Operation information 2 | Exxx-yyyy | Exxx-zzzz | Unit X | Unit Y |
| aaa | DEV00000 | Region A | 2023 Jun. 1 | 1 | 7 | 1 | 0 | 1 | 0 |
| aaa | DEV00001 | Region B | 2023 Jun. 3 | 5 | 10 | 1 | 0 | 0 | 1 |
| aaa | DEV00001 | Region B | 2023 Jun. 5 | 9 | 19 | 0 | 1 | 0 | 1 |
| bbb | DEV00002 | Region C | 2023 Jun. 20 | 2 | 8 | 1 | 0 | 1 | 0 |
| bbb | DEV00002 | Region C | 2023 Jun. 21 | 7 | 15 | 0 | 1 | 0 | 1 |

In step S603, the repair position notification server 105 divides the collected data as shown in Table 7 prepared in step S602 into input data and ground truth data. In the first embodiment, it is assumed that the input data are the values of the columns of the operation information 1, the operation information 2, and the error code, and the ground truth data are the values of the columns of the unit X and the unit Y.

Note that, as the input data, values of time information (for example, time when copy is executed), user attributes (for example, department, job title, and age), image forming apparatus attributes (for example, model, installation location, and copy speed), and the like may be used.

Next, in step S604, the repair position notification server 105 determines whether or not the setting items (the unit X and the unit Y) of the ground truth date generated in step S603 have been processed for all the setting items one by one. When the determination result is "YES", the flow of learning model creation of FIG. 6 ends. When the determination result is "NO", the process proceeds to step S605.

Although, in the first embodiment, the ground truth data are processed for each setting item, a plurality of setting items may be collectively learned. However, in order to perform estimation with high accuracy in a case in which a plurality of setting items of the ground truth data is collectively learned, a large amount of data is required. For example, it is difficult to collect a large amount of learning data for each device number, and the amount of learning data is small. Thus, there is a possibility that the estimation accuracy decreases.

In step S605, the repair position notification server 105 learns one setting item of the input data and the ground truth data generated in step S603 by using a support vector machine (SVM).

The SVM is a well-known machine learning algorithm, and in the first embodiment, a non-linear soft margin SVM using a radial basis function kernel (RBF) is used. Additionally, when learning is performed, the learning result is evaluated by cross verification in which learning data is randomly divided into analysis data and verification data.

Note that the hyperparameters in the SVM using the RBF include a cost parameter (C) and a gamma (γ), which affect the estimation performance, and, therefore, a grid search in Additionally, SVM includes types such as hard margin SVM and polynomial kernel SVM, and any of them may be used. Additionally, the hyper-parameter of the machine learning algorithm may be varied depending on the machine learning algorithm. Additionally, as a method of evaluating the learning result, an alternative estimation method, a test sample method, and the like may be used, instead of the cross-verification method.

Furthermore, as a method of optimizing the hyper-parameter of the machine learning algorithm, any one of a grid search, a random search, a Latin hypercube sampling method, a Bayesian optimizing method, and the like may be used. In the first embodiment, the machine learning algorithm, the method of evaluating the learning result, the method of optimizing the hyper-parameter of the machine learning algorithm, and the like may be appropriately changed or combined.

In step S606, the repair position notification server 105 stores the learned model learned in step S605 in a file and registers the learned model in the machine learning model management unit 408. Here, the file in which the learned model is stored includes the type of learning algorithm (for example, non-linear soft margin SVM by RBF), the value of the hyper-parameter of the learning algorithm (cost parameter (C) and gamma (γ)), and the like.

After the learned model is stored in step S606, the process returns to step S604, and it is determined whether or not the ground truth data has been processed for all the items, and if the determination result is "NO", steps S605 and S606 are repeated, and when the determination result is "YES", the process proceeds to step S607, and the flow of FIG. 6 ends.

Second Embodiment

According to the first embodiment, the data for learning can be enriched by duplicating the data based on the corresponding relation between the replacement data of parts having different scales such as a part unit and a unit. However, there is a case in which units to be handled are different depending on product models of a devices. When data also including a unit that is not originally handled in the product model is duplicated and learned, there are also cases in which data of a pattern that may not actually occur is also learned, and learning accuracy decreases in some cases.

Accordingly, in the second embodiment, data duplication is performed only on a unit that includes a replaced part and that is handled by the product model. As a result, data can be duplicated while excluding a pattern that may not actually occur, and learning accuracy can be improved.

The system configuration diagram, the hardware configuration diagram, the input terminal screen example diagram, and the software configuration diagram of the second embodiment are respectively similar to those in FIG. 1 to FIG. 4 of the first embodiment, and thus the explanation thereof will be omitted. Additionally, since the overall flowchart of the repair position notification server 105 is similar to that in FIG. 5A of the first embodiment, and the explanation thereof will be omitted.

Figure 7:
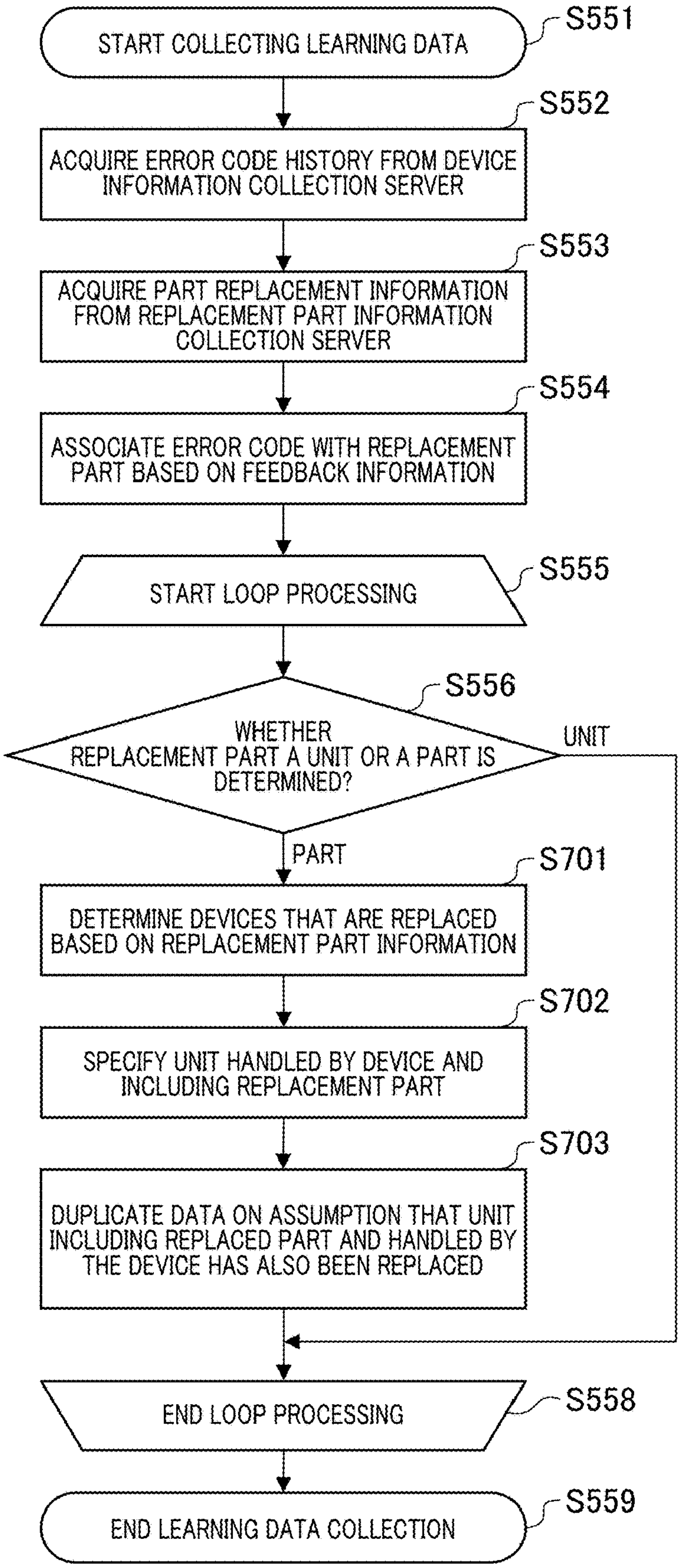
FIG. 7 is a flowchart of learning data collection processing focused on device target units according to the second embodiment of the present invention.

FIG. 7 is a flowchart of the learning data collecting processing focused on the device target unit according to the second embodiment of the present invention, and shows the details of the learning data collecting step (step S502) of the repair position notification server 105 in the second embodiment.

Note that the CPU and the like serving as a computer in the repair position notification server 105 executes a computer program stored in the memory, and thereby, the operation of each step in the flowchart of FIG. 7 is sequentially performed.

The processing contents of step S551 to step S556, step S558, and step S559 are the same as the processing contents shown in FIG. 5B, and thus the explanation thereof will be omitted. In a case in which it is determined in step S556 that the replacement part is a unit, the loop processing is performed so as to proceed to the data of the next row without executing the processes of steps S701 to S703.

In a case in which it is determined in step S556 that the replacement part is a part, in step S701, a device (product model) that has performed the replacement processing of the part is specified from the "product" column of the table of association between errors and replacement parts shown in Table 4.

Next, in step S702, the unit/part correspondence information (including handling model information) as shown in Table 8 is referred to, and a unit that includes the replaced part and is a unit that is a target handled by the product model is specified. Here, step S702 functions as a model specifying step (model specifying unit) that specifies whether or not the target device in which the predetermined part has been replaced is a model in which another replacement part can be used.

In Table 8, the "unit name" is the name of the unit, the "included parts" is a list of parts included in the unit. The "handling model" is a list of product models that handle the unit. For example, the first row of Table 8 means that "the unit X includes the part A and the part D, and is a target handled by the product models bbb and ccc".

TABLE 8

Unit/part correspondence information (including handling model)

| Unit name | Included part | Handling model |
|---|---|---|
| Unit X | [Part A, Part D] | [bbb, ccc] |
| Unit Y | [Part B, Part C, Part D] | [aaa, bbb, ddd] |

In step S703, in the case of the unit that includes the replaced part and that is a handling target by the product model, the replacement part information is duplicated on the assumption that the unit has also been replaced.

Additionally, with respect to the unit specified in step S702, the data associating the error and the replacement part is duplicated, and each of the replacement part columns is replaced with the specified unit. That is, in step S703, in a case in which the target device specified in step S702, which functions as the model specifying step, is a model capable of using another replacement part, the second association information is generated.

Furthermore, the processes of step S556 and step S701 to step S703 as described above are executed for all rows by the loop processing of step S555 and step S558, and then the process proceeds to step S559, and the flow of learning data collection ends.

An example of the association between the error and the replacement part (including the duplicated and handled model) at the time when the process proceeds to step S559 and the learning data collection ends is shown in Table 9. In the duplicate data, "*" is attached to the item of "replacement part".

As a result of comparison with Table 6 of the first embodiment, it is found that the replacement information of the part A generated in DEV00000 in the first row is not duplicated as the unit replacement information. This is because, in Table 8, the product model aaa is not included in the target models of the unit X.

TABLE 9

Association between error and replacement part (including duplicated and handling model)

| Product | Body No. | Region | Error occurrence date | Occurrence error code | Replacement part |
|---|---|---|---|---|---|
| aaa | DEV00000 | Region A | 2023 Jun. 01 | Exxx-yyyy | Part A |
| aaa | DEV00001 | Region B | 2023 Jun. 03 | Exxx-yyyy | Part B |
| aaa | DEV00001 | Region B | 2023 Jun. 03 | Exxx-yyyy | Unit Y* |
| aaa | DEV00001 | Region B | 2023 Jun. 05 | Exxx-zzzz | Part C |
| aaa | DEV00001 | Region B | 2023 Jun. 05 | Exxx-zzzz | Unit Y* |
| bbb | DEV00002 | Region C | 2023 Jun. 20 | Exxx-yyyy | Unit X |
| bbb | DEV00002 | Region C | 2023 Jun. 21 | Exxx-zzzz | Unit Y |

Note that, in relation to step S554 to step S703, in the second embodiment, it is determined whether the replacement part is a unit or a part after performing the association, and the duplication of the replacement part is performed. However, these processes may be replaced in order so that, first, the data is duplicated after determining whether the replacement part is a unit or a part, and then the association is performed.

Note that the sequence of machine learning model creation in the second embodiment may be similar to the sequence shown in FIG. 6 of the first embodiment, and the explanation thereof will be omitted.

According to the second embodiment, when the association data between the error and the replacement part is duplicated, only the unit that includes the part and that is handled by the product model is duplicated, and thereby, it is possible to amplify the learning data while limiting to the unit replacement that may actually occur. Accordingly, it is possible to improve the learning accuracy of each part having a different scale in the prediction of a replacement part for an error.

Third Embodiment

In the first embodiment, it is assumed the data for learning is enriched by duplicating the data based on the corresponding relation between the replacement data of parts having different scales such as a part unit and a unit. However, there may be a difference in units to be handled, depending on the region. Even in this case, some parts may be used in a plurality of units.

Therefore, when data is duplicated for all units including a certain part, there is a possibility that learning is performed by also including units that are not originally handled in the region. As a result, there is a possibility that data of a pattern that may not actually occur is also learned, and learning accuracy decreases.

Therefore, in the third embodiment, data duplication is performed only for a unit that includes a replaced part and is handled in the region. As a result, data can be duplicated while excluding a pattern that may not actually occur, and learning accuracy can be improved.

Since the system configuration diagram, the hardware configuration diagram, the input terminal screen example diagram, and the software configuration diagram of the third embodiment are similar to those of FIG. 1 to FIG. 4 of the first embodiment, the explanation thereof will be omitted. Additionally, since the overall flowchart of the repair position notification server 105 is similar to that in FIG. 5A of the first embodiment, and the explanation thereof will be omitted.

Figure 8:
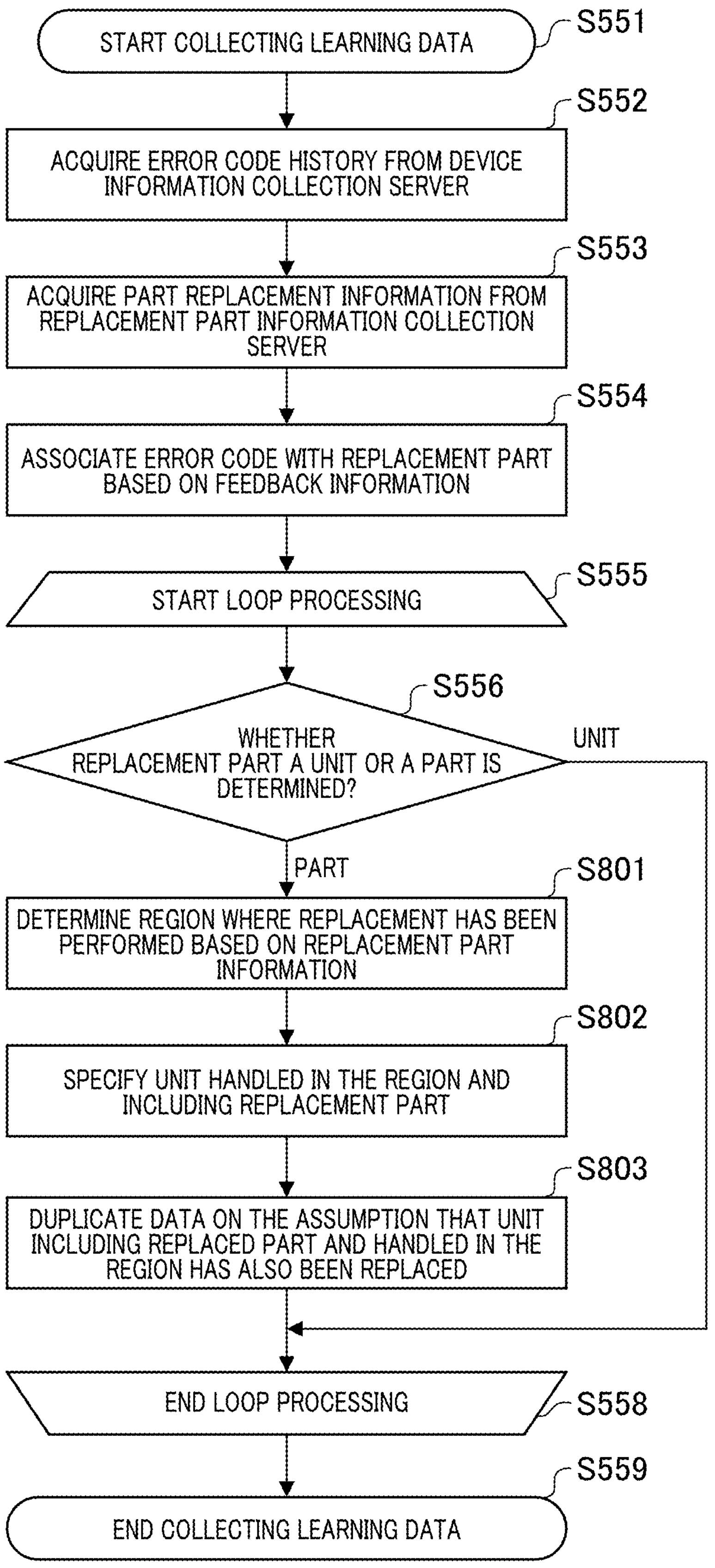
FIG. 8 is a flowchart of learning data collection processing focused on region target units according to the third embodiment of the present invention.

FIG. 8 is a flowchart of the learning data collecting processing focused on the region target unit according to the third embodiment of the present invention, and shows the details of the learning data collecting step (step S502) of the repair position notification server 105 in the third embodiment.

Note that the CPU and the like serving as a computer in the repair position notification server 105 executes a computer program stored in the memory, and thereby, the operation of each step in the flowchart of FIG. 8 is sequentially performed.

Since the contents of processes of step S551 to step S556, step S558, and step S559 are the same as the contents of processing as shown in FIG. 5B, the explanation thereof will be omitted. In a case in which it is determined in step S556 that the replacement part is a unit, the loop processing is performed so as to proceed to the data of the next row without executing the processes of steps S801 to S803.

In a case in which it is determined, in step S556, that the replacement part is a part, in step S801, the region in which the replacement processing of the part has been performed is specified from the "region" column of the table of the association between the error and the replacement part shown in Table 4.

Next, in step S802, the unit/part correspondence information (including the handling region information) as shown in Table 10 is referred to, and a unit that includes the replaced part and that is a target handled in the device installation region is specified. Here, step S802 functions as region specifying step (region specifying unit) that specifies an installation region of the target device in which the predetermined part has been replaced.

In Table 10, the "unit name" is a name representing a unit, the "included parts" is a list of parts included in the unit. The "handling region" is a list of regions where the unit is handled. For example, the first row of Table 10 means that "unit X includes part A and part D and is a target handled in the region A, region B, and region C".

TABLE 10

Unit/part correspondence information (including handling region)

| Unit name | Included part | Handling region |
|---|---|---|
| Unit X | [Part A, Part D] | [Region A, Region B, Region C] |
| Unit Y | [Part B, Part C, Part D] | [Region A, Region C, Region D] |

In step S803, in the case of the unit that includes the replaced part and that is a handling target in the region, the replacement part information is duplicated on the assumption that the unit has also been replaced.

With respect to the unit specified in step S802, the data associating the error and the replacement part is duplicated, and each of the replacement part columns is replaced with the specified unit. That is, in step S803, in a case in which the installation region specified in step S802 functioning as the region identification step is a region in which other replacement parts can be handled, the second association is generated.

Furthermore, the processes of step S556 and step S801 to step S803 as described above are executed for all rows by the loop processing of step S555 and step S558, and then the process proceeds to step S559, and the flow of learning data collection ends.

An example of the association between the error and the replacement part (duplicated and included in the handling region) at the time when the process proceeds to step S559 and the learning data collection ends is shown in Table 11. In the duplicate data, "*" is appended to the item of the replacement part.

As a result of comparison with Table 6 of the first embodiment, it is found that the replacement information of the part B and the part C generated in DEV00001 is not duplicated as the unit replacement information in the third and fourth rows of Table 11. This is because, in Table 10, the region B is not included in the target model of the unit Y.

TABLE 11

Association between error and replacement part (including duplicated and handling region)

| Product | Body No. | Region | Error occurrence date | Occurrence error code | Replacement part |
|---|---|---|---|---|---|
| aaa | DEV00000 | Region A | 2023 Jun. 01 | Exxx-yyyy | Part A |
| aaa | DEV00000 | Region A | 2023 Jun. 01 | Exxx-yyyy | Unit X* |
| aaa | DEV00001 | Region B | 2023 Jun. 03 | Exxx-yyyy | Part B |
| aaa | DEV00001 | Region B | 2023 Jun. 05 | Exxx-zzzz | Part C |
| bbb | DEV00002 | Region C | 2023 Jun. 20 | Exxx-yyyy | Unit X |
| bbb | DEV00002 | Region C | 2023 Jun. 21 | Exxx-zzzz | Unit Y |

Note that, with respect to steps S554 to S803, in the third embodiment, it is determined whether the replacement part is a unit or a part after performing the association, and the data is duplicated. However, these processes may be replaced in order so that, first, the data is duplicated after determining whether the replacement part is a unit or a part, and then the association may be performed.

Note that the sequence of machine learning model creation in the third embodiment may be similar to the sequence shown in FIG. 6 of the first embodiment, and the explanation thereof will be omitted.

According to third embodiment, when the association data between the error and the replacement part is duplicated, only a unit that includes the part and that is handled in the region is duplicated, and thereby, it is possible to amplify the learning data while limiting to unit replacement that may actually occur. Thereby, it is possible to improve the learning accuracy of each part having a different scale in the prediction of a replacement part for an error.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

For example, in Table 6, Table 9, and Table 11 of the above-described embodiments, the first association data and the second association data are in different rows. However, for example, the first association data and the second association data may be included in one row by providing a part column and a unit column in the same row.

Although, an example of the image forming apparatus has been explained as a device to be repaired (target device), the target device may be any devices as long as the devices requires replacement of a part, and may be, for example, an automobile, a ship, an aircraft, a plant, and the like.

In addition, as a part or the whole of the control according to the embodiments, a computer program realizing the function of the embodiments described above may be supplied to the information processing apparatus and the like through a network or various storage media. Then, a computer (or a CPU, an MPU, or the like) of the information processing apparatus and the like may be configured to read and execute the program. In such a case, the program and the storage medium storing the program configure the present invention.

In addition, the present invention includes those realized using at least one processor or circuit configured to perform function of the embodiments explained above, for example. Dispersion processing may be performed using a plurality of processors.

This application claims the benefit of priority from Japanese Patent Application No. 2023-080385, filed on May 15, 2023, which is hereby incorporated by reference herein in its entirety.

What is claimed is:

1. An information processing system that collects learning data comprising:

at least one processor or circuit configured to function as:

an error history information acquiring unit configured to acquire error history information of a target device;

a part replacement information acquisition unit configured to acquire part replacement information of the target device;

an association unit configured to generate first association data in which the error history information and the part replacement information are associated with each other; and a duplication unit configured to generate second association data in which information on a predetermined replacement part is replaced with information on another replacement part that includes the predetermined replacement part and associated with the error history information.

2. The information processing system according to claim 1, wherein the at least one processor or circuit is further configured to function as, a learning unit configured to perform learning using each of the first association data and the second association data.

3. The information processing system according to claim 1, wherein the duplication unit performs duplication by replacing information on the predetermined replacement part in the first association data with information on the another replacement part and generates the second association data associated with the error history information.

4. The information processing system according to claim 1, wherein the duplication unit replaces information on the predetermined replacement part with information on the another replacement part, and then generates the second association data in which the information on the another replacement part is associated with the error history information.

5. The information processing system according to claim 1, wherein the at least one processor or circuit is further configured to function as, a model specifying unit configured to specify whether or not the target device in which the replacement of the predetermined part has been performed is a model capable of using the another replacement part, and wherein the duplication unit generates the second association data in a case in which the target device specified by the model specifying unit is a model capable of using the another replacement part.

6. The information processing system according to claim 1, wherein the at least one processor or circuit is further configured to function as a region specifying unit configured to specify an installation region of the target device in which the replacement of the predetermined part has been performed, and wherein the duplication unit generates the second association data in a case in which the installation region specified by the region specifying unit is a region in which the another replacement part can be used.

7. An information processing method in which learning data is collected comprising:

acquiring error history information of a target device;

acquiring part replacement information of the target device;

performing association in which first association data in which the error history information and the part replacement information are associated with each other is generated; and performing duplication in which second association data in which information on a predetermined replacement part is replaced with information on another replacement part that includes the predetermined replacement part and associated with the error history information.

8. A non-transitory computer-readable storage medium configured to store a computer program for collecting learning data, comprising instructions for executing following processes:

acquiring error history information of a target device;

acquiring part replacement information of the target device;

performing association in which first association data in which the error history information and the part replacement information are associated with each other is generated; and performing duplication in which second association data in which information on a predetermined replacement part is replaced with information on another replacement part that includes the predetermined replacement part and associated with the error history information.

* * * * *